United States Patent [19]
Pecone et al.

[11] Patent Number: 6,098,140
[45] Date of Patent: *Aug. 1, 2000

[54] MODULAR BUS BRIDGE SYSTEM COMPATIBLE WITH MULTIPLE BUS PIN CONFIGURATIONS

[75] Inventors: Victor Key Pecone, Lyons; Dwayne Howard Swanson, Westminster, both of Colo.

[73] Assignee: Adaptec, Inc., Milpitas, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/096,096

[22] Filed: Jun. 11, 1998

[51] Int. Cl.[7] ........................................... G06F 13/00
[52] U.S. Cl. ............................ 710/129; 710/102
[58] Field of Search ...................... 710/100, 105, 710/129, 126, 102, 103; 711/113, 114, 118

[56] References Cited

U.S. PATENT DOCUMENTS

| | | | |
|---|---|---|---|
| 5,652,857 | 7/1997 | Shimoi et al. | 711/113 |
| 5,812,798 | 9/1998 | Moyer et al. | 710/127 |
| 5,832,310 | 11/1998 | Morrissey et al. | 710/71 |
| 5,872,941 | 2/1999 | Goodrum et al. | 395/308 |
| 5,881,254 | 3/1999 | Corrigan et al. | 710/129 |
| 5,937,174 | 8/1999 | Weber | 711/113 |

*Primary Examiner*—Glenn A. Auve
*Attorney, Agent, or Firm*—Duft, Graziano & Forest, P.C.

[57] ABSTRACT

The invention is a bus bridge for connecting a computer to peripheral devices over plurality of different bus interface configurations. The bus bridge comprises a motherboard and daughterboards. The daughterboards can be connected to the motherboard or to other daughterboards to create a new bus interface configuration. The bus bridge detects the new bus interface configuration and retrieves operating parameters to implement the new bus interface configuration. In some embodiments of the invention, the bus interface configuration is a fiber channel to the computer, a first small computer system interface to a first group of the peripheral devices, and a second small computer system interface to a second group of the peripheral devices.

18 Claims, 5 Drawing Sheets

MODULAR BUS BRIDGE SYSTEM COMPATIBLE WITH MULTIPLE BUS PIN CONFIGURATIONS

FIELD OF THE INVENTION

The invention is related to the field of bus bridges, and in particular, to a bus bridge that allows modular upgrades to new bus interface configurations and that automatically implements operating parameters for the new bus interface configurations.

PROBLEM

The microprocessor in a computer exchanges data with peripheral devices, such as disk drives, compact disk players, and printers. A bus interface is required between the microprocessor and the peripheral devices to transfer the data. One popular bus interface is the Small Computer System Interface (SCSI, pronounced "scuzzy"). SCSI is specified in the X3T9.2 standard from the American National Standards Institute (ANSI). Peripheral devices can be daisy chained together over the SCSI bus. Typically, only four or five peripheral devices are connected before bus performance begins to suffer. If more peripheral devices need to be connected, then the microprocessor is connected to a second SCSI bus using a bus bridge. The microprocessor is connected to the bus bridge by a first SCSI bus, and the bus bridge is connected to the peripheral devices by a second SCSI bus and a third SCSI bus.

A problem arises when a computer user desires to add peripheral devices that require additional bus interface capability. For example, the computer user may desire to upgrade the SCSI bus between the computer microprocessor and the bus bridge to a fiber channel bus. Fiber channel is specified by ANSI standard X3T9.3. The computer user must replace the existing bus bridge with a new bus bridge. The replacement of an operational bus bridge represents a loss in value that inhibits the decision to upgrade the bus bridge to accommodate additional peripheral devices.

The problem is illustrated with respect to a Redundant Array of Inexpensive Disks (RAID). A RAID system stores data on multiple disk drives to protect the data against disk drive failure. If one disk drive fails, then the RAID system reconstructs the data from the remaining disk drives. A RAID system uses a RAID controller to interface with the computer microprocessor. The RAID controller acts as a bus bridge between the microprocessor and the disk drives. The bus interface between the microprocessor and the RAID controller, and the bus interfaces between RAID controller and the disk drives are often SCSI bus interfaces.

With the ever-increasing demand for data storage, RAID controllers often require upgrades with additional disk drives or faster bus interfaces. Unfortunately, the RAID controller may not be configured to add additional bus interface capability and must be replaced. The replacement of an operational RAID controller represents a loss in value that inhibits the decision to upgrade the RAID controller to accommodate additional disk drives or faster bus interfaces.

A bus bridge that allows additional bus interface capability to be added without the costly replacement of the existing bus bridge could improve computer systems. In particular, a RAID controller could be improved if it allowed additional disk drives and faster bus interfaces to be connected without replacing the RAID controller.

SOLUTION

The invention overcomes the above problems by providing a device that enables upgrades to a bus bridge without the need to replace equipment. The bus bridge can be upgraded with additional bus interfaces or faster bus interfaces. The modular upgrade capability avoids the loss in value that corresponds to the replacement of operational equipment. The decision to upgrade the bus bridge is not inhibited by this potential loss of value that plagues current bus bridges.

The invention is a bus bridge for connecting a computer to peripheral devices over a plurality of different bus interface configurations. The bus bridge detects the current bus interface configuration and implements operating parameters for the current bus interface configuration. The bus bridge comprises a motherboard and at least a first daughterboard. In some embodiments, the invention also includes a second daughterboard.

The motherboard includes a first connector for the computer and a second connector coupled to the first connector. The motherboard includes a processor that executes instructions. The instructions direct the processor to detect the current bus interface configuration and to retrieve operating parameters to implement the current bus interface configuration. The motherboard includes a memory for storing the instructions and the operating parameters. The first daughterboard comprises a third connector for connection to the second connector on the motherboard. The first daughterboard also comprises a fourth connector connected to the third connector. The second daughterboard comprises a fifth connector for connection to the fourth connector on the first daughterboard.

The motherboard and the daughterboards include bus interface logic that provides various bus interface configurations depending on the way the boards are connected. In some embodiments of the invention, the second connector is connected to the third connector, and the fourth connector is connected to the fifth connector. The bus interface configuration could be a fiber channel to the computer, a first SCSI bus to a first group of the peripheral devices, and a second SCSI bus to a second group of the peripheral devices. Alternatively, the bus interface configuration could be a first SCSI bus to the computer, a second SCSI bus to a first group of the peripheral devices, and a third SCSI bus to a second group of the peripheral devices.

In a distinct advance in the art, daughterboards can be plugged into the motherboard of a RAID controller to upgrade the bus interfaces to the computer or disk drives. For example, the RAID controller may have a SCSI bus interface for the computer and two SCSI bus interfaces for the disk drives. A fiber channel daughterboard can be added to automatically reconfigure the system. The reconfigured system would now have a fiber channel bus interface for the computer and three SCSI bus interfaces for the disk drives. Advantageously, the RAID controller automatically senses the new bus interface configuration and implements operating parameters for the new bus interface configuration.

DETAILED DESCRIPTION
System Components—FIGS. 1–8

Figure 1:
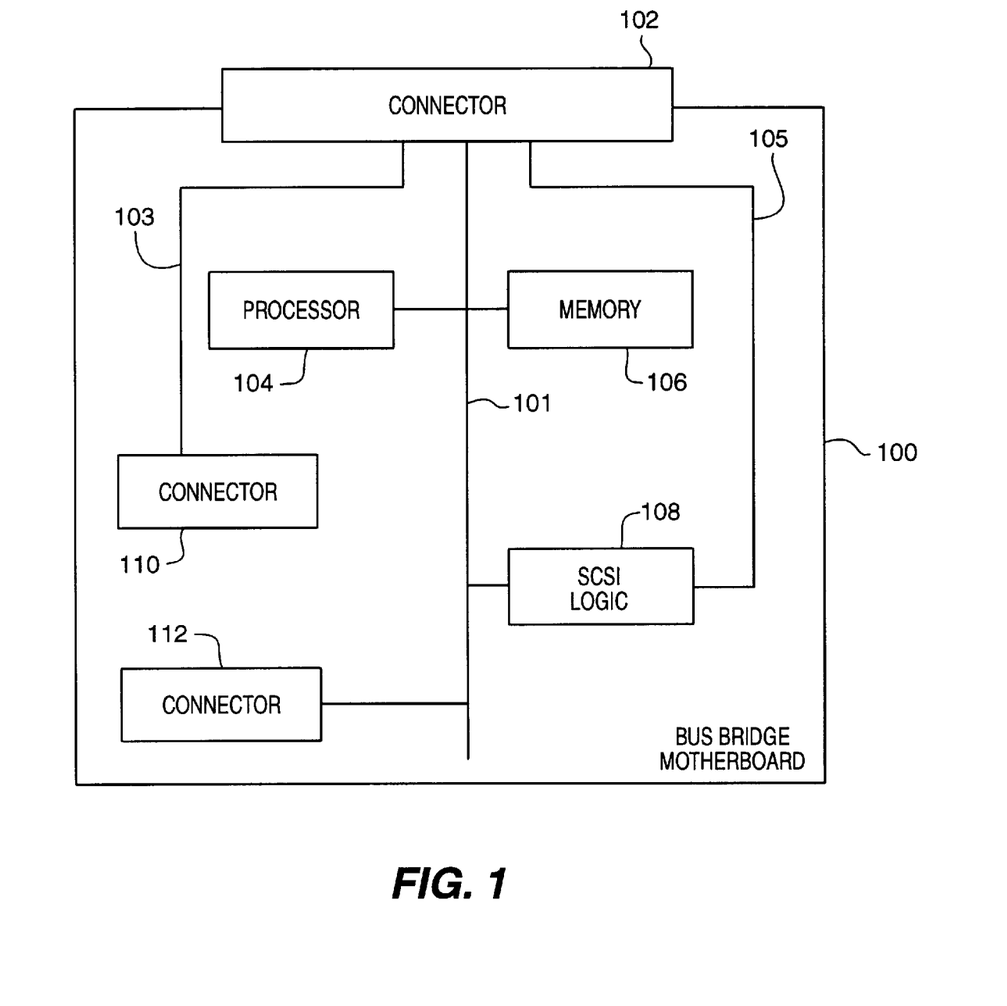
FIG. 1 is a block diagram of a motherboard in an embodiment of the invention.

FIG. 1 depicts a bus bridge motherboard 100 comprising a bus 101, connector 102, bus 103, processor 104, bus 105, memory 106, SCSI logic 108, connector 110, and connector 112. The bus bridge motherboard 100 interconnects a bus interface for a computer with the bus interfaces for peripheral devices. The bus bridge motherboard 100 is typically housed in an enclosure, although the enclosure is not shown and is not required. Those skilled in the art recognize that FIGS. 1–8 are simplified for clarity and that numerous conventional elements of a bus bridge have been omitted. A bus bridge system is described in a United States patent application by Farzad Khosrowpour, entitled "FAULT TOLERANT REDUNDANT BUS BRIDGE SYSTEMS AND METHODS", filed on Apr. 17,1998, assigned to the same entity as this application, and that is hereby incorporated by reference into this application.

The bus 101 is a Peripheral Component Interconnect (PCI) bus that provides connectivity between the connector 102, processor 104, memory 106, SCSI logic 108, and connector 112. The bus 103 connects the connector 110 to the connector 102. The bus 103 is comprised of SCSI and fiber channel connections. The bus 105 connects the SCSI logic 108 with the connector 102. The bus 105 is comprised of SCSI connections.

The connector 102 connects the motherboard 100 to the backplane of a computer. Those skilled in the art are familiar with the backplane connector on a bus bridge. The connector 102 could be a conventional component typically comprised of pins. The pins provide conventional connections to the computer backplane for the busses 101, 103, and 105. The connections provide the bus interface to the computer and the bus interfaces to the peripheral devices. Alternatively, a cable connection could be used to connect the motherboard 100 to the computer.

The processor 104 controls the operation of the bus bridge 100 by executing instructions that are stored in the memory 106. Aside from the instructions and operating parameters required to implement the invention, those skilled in the art are familiar with the processor and memory in a bus bridge. When executed, the instructions direct the processor 104 to determine the current bus interface configuration and retrieve operating parameters to implement the current configuration. Both the processor 104 and the memory 106 could be conventional components. The processor 104 and the memory 106 are shown as discreet components, but they could be integrated into a single component.

The operating parameters specify the assignments for the various pins in the connectors 102, 110, and 112 to implement the bus interface configuration. For example, the current bus interface configuration could be a SCSI bus interface for the computer and two SCSI bus interfaces for the peripheral devices. The operating parameters would specify the assignment of particular pins to particular functions for particular bus interfaces. Those skilled in the art are familiar with the pin assignments for a particular bus interface configuration of a bus bridge.

The SCSI logic 108 provides a SCSI interface to the motherboard 100. Those skilled in the art are familiar with SCSI logic in a bus bridge. Typically, the SCSI logic 108 is used to provide a SCSI interface through the connector 102 to the computer or to the peripheral devices. The SCSI logic 108 could be a conventional SCSI integrated circuit.

The connectors 110 and 112 allow a daughterboard to be connected to the motherboard 100. The connector 110 includes SCSI and fiber channel connections. The connector 112 includes PCI connections. The connectors 110 and 112 are typically female receptacles that receive the pins from a male connector on the daughterboard. The connectors 110 and 112 could be conventional.

Figure 2:
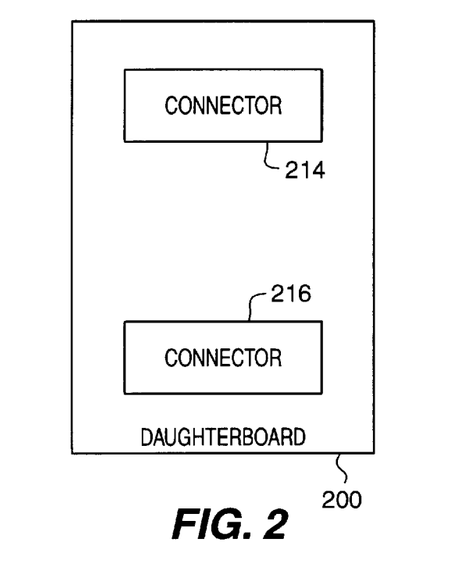
FIG. 2 is a block diagram of a daughterboard in an embodiment of the invention.

FIG. 2 depicts the bottom view of a daughterboard 200. The bottom of the daughterboard 200 comprises connectors 214 and 216. The connector 214 includes SCSI and fiber channel connections. The connector 216 includes PCI connections. The connectors 214 and 216 are typically male pins that fit into the respective female receptacles of the connectors 110 and 112 on the motherboard 100. The connectors 214 and 216 would also fit into similar connectors on another daughterboard. The connectors 214 and 216 could be conventional.

Figure 3:
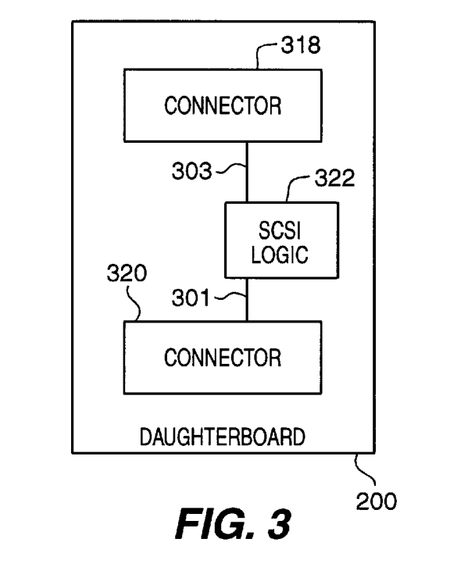
FIG. 3 is a block diagram of a daughterboard in an embodiment of the invention.

FIG. 3 depicts the top view of the daughterboard 200. The top of the daughterboard 200 comprises a bus 301, a bus 303, and connectors 318 and 320. The bus 301 includes PCI connections, and the bus 303 includes SCSI connections. The connector 318 includes SCSI and fiber channel connections. The connector 320 includes PCI connections. The connectors 318 and 320 allow another daughterboard to be connected to the daughterboard 200. The connectors 318 and 320 are typically female receptacles that receive the pins from a male connector on the other daughterboard. The connectors 318 and 320 could be conventional. The connectors 318 and 320 are depicted as discreet components, but they could be integrated together. The term "connector" includes both an integrated connector or discreet connectors.

The daughterboard 200 also includes SCSI logic 322. The SCSI logic 322 provides a SCSI interface capability to the daughterboard 200. Typically, the SCSI logic 322 is used to provide a SCSI interface through the connectors 318, 214, 110, and 102 to the computer or to the peripheral devices. The SCSI logic 322 could be a conventional SCSI integrated circuit.

Figure 4:
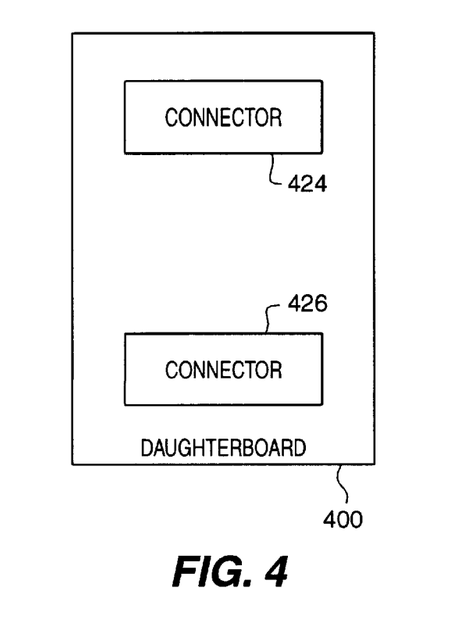
FIG. 4 is a block diagram of a daughterboard in an embodiment of the invention.

FIG. 4 depicts the bottom view of a daughterboard 400. The bottom of the daughterboard 400 comprises connectors 424 and 426. The connector 424 includes SCSI and fiber channel connections. The connector 426 includes PCI connections. The connectors 424 and 426 are typically male pins that fit into the respective female receptacles of the connectors 110 and 112 on the motherboard 100. The connectors 424 and 426 would also fit into connectors 318 and 320 on the daughterboard 200. The connectors 424 and 426 could be conventional.

Figure 5:
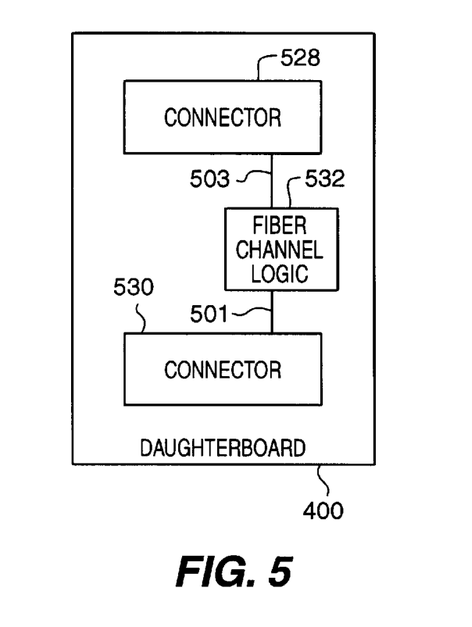
FIG. 5 is a block diagram of a daughterboard in an embodiment of the invention.

FIG. 5 depicts the top view of the daughterboard 400. The top of the daughterboard 400 comprises a bus 501, a bus 503, and connectors 528 and 530. The bus 501 includes PCI connections, and the bus 503 includes fiber channel connections. The connector 528 includes SCSI and fiber channel connections. The connector 530 includes PCI connections.

The connectors 528 and 530 allow another daughterboard to be connected to the daughterboard 400. The connectors 528 and 530 are typically female receptacles that receive the male pins from a connector on the other daughterboard. The connectors 528 and 530 could be conventional.

The daughterboard 400 also includes fiber channel logic 532. Those skilled in the art are familiar with fiber channel logic in a bus bridge. The fiber channel logic 532 provides a fiber channel interface capability to the daughterboard 400. Typically, the fiber channel logic 532 is used to provide a fiber channel interface through the connectors 528, 424, 110, and 102 to the computer or to the peripheral devices. The fiber channel logic 532 could be a conventional fiber channel integrated circuit.

Figure 6:
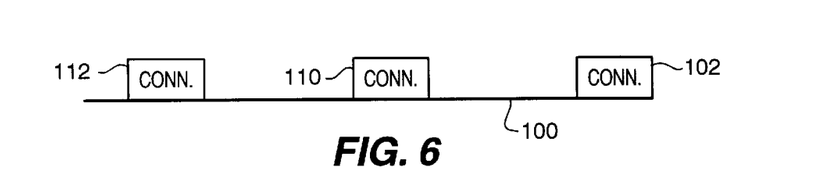
FIG. 6 is a block diagram of a motherboard in an embodiment of the invention.
Figure 7:
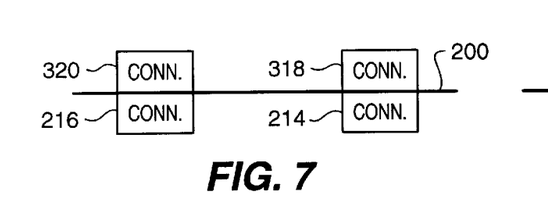
FIG. 7 is a block diagram of a daughterboard in an embodiment of the invention.
Figure 8:
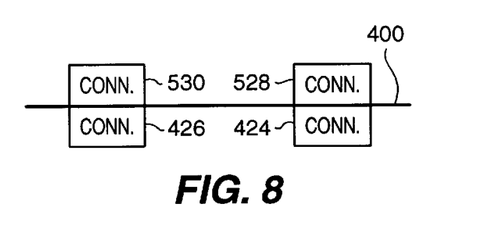
FIG. 8 is a block diagram of a daughterboard in an embodiment of the invention.

FIG. 6 depicts a side view of the motherboard 100. The connectors 102, 110, and 112 are shown. FIG. 7 depicts a side view of the daughterboard 200. The connectors 214 and 216 are shown on the bottom. The connectors 318 and 320 are shown on the top. FIG. 8 depicts a side view of the daughterboard 400. The connectors 424 and 426 are shown on the bottom. The connectors 528 and 530 are shown on the top.

Aside from the connector 102, the other connectors are depicted in pairs on FIGS. 1–5: 110 and 112, 214 and 216, 318 and 320, 424 and 426, and 528 and 530. A pair of these connectors could be integrated into a single connector with the appropriate connections. For example, the connectors 110 and 112 could be integrated into a single connector with PCI, SCSI, and fiber channel connections. Connectors 214 and 216 could be integrated together in a similar manner. The term "connector" includes both the discreet pair of connectors or a single integrated connector.

System Configuration—FIGS. 9–12

Figure 9:
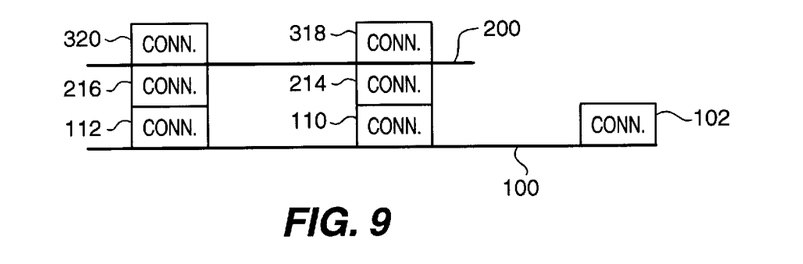
FIG. 9 is a block diagram of a motherboard connected to a daughterboard in an embodiment of the invention.

FIG. 9 depicts the motherboard 100 connected to the daughterboard 200. The connector 110 is connected to the connector 214, and the connector 112 is connected to the connector 216. Connectors 110, 214, and 318 include SCSI and fiber channel connections. Connectors 112, 216, and 320 include PCI connections. The daughterboard 200 can typically be plugged into the motherboard 100 by hand, and subsequently unplugged by hand. The motherboard 100 and the daughterboard 200 typically snap together in a conventional manner to fit male pins into female receptacles. Although FIG. 9 depicts the motherboard 100 connected to the daughterboard 200, the motherboard 100 could be connected to the daughterboard 400 in the same manner.

Figure 10:
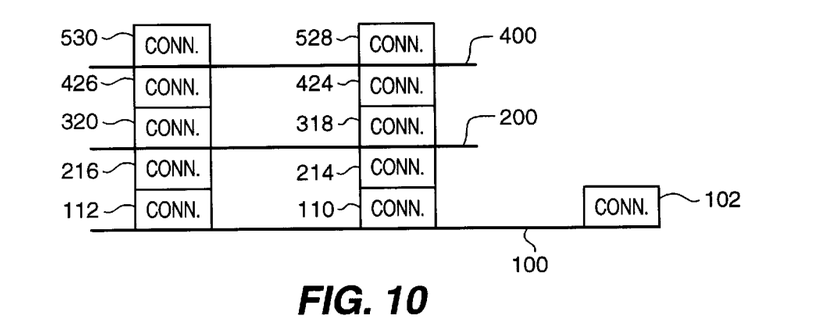
FIG. 10 is a block diagram of a motherboard connected to two daughterboards in an embodiment of the invention.

FIG. 10 depicts the daughterboard 400 connected to the daughterboard 200, and the daughterboard 200 connected to the motherboard 100. The connector 110 is connected to the connector 214, and the connector 112 is connected to the connector 216. The connector 318 is connected to the connector 424, and the connector 320 is connected to the connector 426. Connectors 110, 214, 318, 424, and 528 include SCSI and fiber channel connections. Connectors 112, 216, 320, 426, and 530 include PCI connections. The daughterboard 400 can typically be plugged into the daughterboard 200 by hand, and subsequently unplugged by hand. The daughterboard 200 and the daughterboard 400 typically snap together in a conventional manner to fit male pins into female receptacles. FIG. 10 depicts the daughterboard 400 connected to the daughterboard 200, and the daughterboard 200 connected to the motherboard 100. The motherboard 100 could also be connected to the daughterboard 400, and the daughterboard 400 could be connected to the daughterboard 200 in the same manner.

It should be appreciated from the above discussion that the motherboard 100 and the daughterboards 200 and 400 can be interconnected in a modular fashion using conventional connectors. Additional daughterboards could also be connected in the same manner. The daughterboards provide bus interface upgrades to the bus bridge. It should also be appreciated that alternative interfaces other than SCSI and fiber channel could be included on the boards. A technique for interconnecting the boards is described in United States patent application entitled "STACKED I/O BRIDGE CIRCUIT ASSEMBLIES HAVING FLEXIBLY CONFIGURABLE CONNECTIONS", by Victor Picone and Farzad Khosrowpour, filed on the same date as this application, assigned to the same entity as this application, and hereby incorporated by reference into this application.

Figure 11:
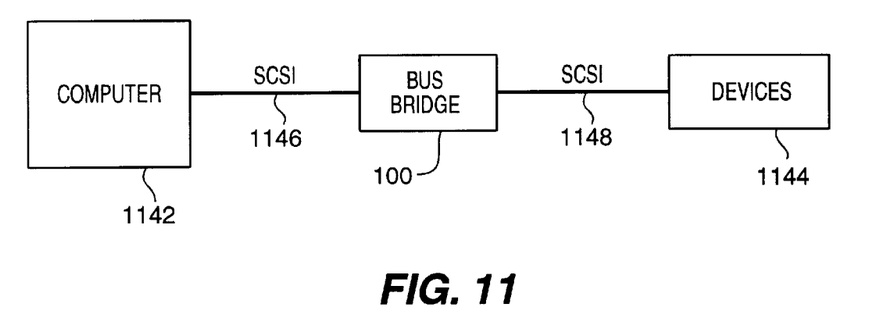
FIG. 11 is a block diagram of a bus interface configuration in an embodiment of the invention.

FIG. 11 depicts a first bus interface configuration, but the invention is not restricted to this particular configuration. The bus bridge 100 is connected to a computer 1142 over a SCSI bus interface 1146. The bus bridge 100 is connected to peripheral devices 1144 over SCSI bus interface 1148. Thus, the first bus interface configuration is a SCSI bus interface for the computer and a SCSI bus interface for the peripheral devices. The first bus interface configuration would result from connecting the daughterboard 200 to the motherboard 100 as shown in FIG. 9.

Figure 12:
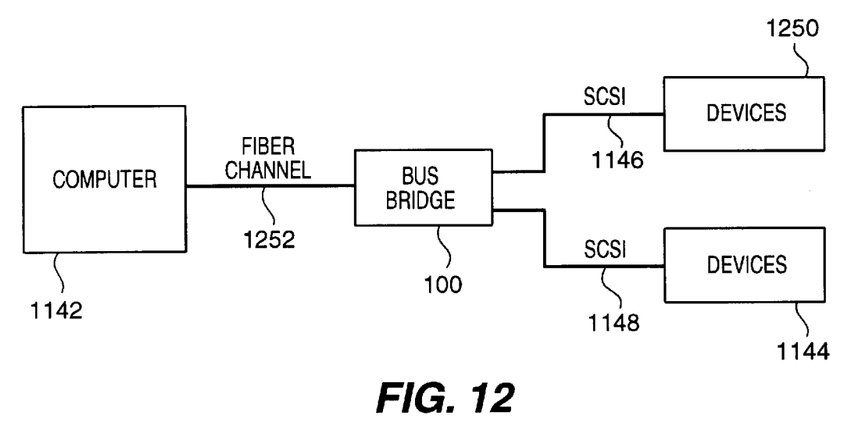
FIG. 12 is a block diagram of a bus interface configuration in an embodiment of the invention.

FIG. 12 depicts a second bus interface configuration, but the invention is not restricted to this particular configuration. The bus bridge 100 is connected to the computer 1142 over a fiber channel bus interface 1252. The bus bridge 100 is connected to peripheral devices 1250 and 1144 over SCSI bus interfaces 1146 and 1148 respectively. Thus, the second bus interface configuration is a fiber channel bus interface for the computer and two SCSI bus interfaces for the peripheral devices. The second bus interface configuration would result from connecting the daughterboard 400 to the daughterboard 200 and connecting the daughterboard 200 to the motherboard 100 as shown in FIG. 10.

Advantageously, the user can upgrade from the bus interface configuration shown in FIG. 11 to the bus interface configuration shown in FIG. 12 by plugging in a new daughterboard. Specifically, the daughterboard 400 is added to upgrade from the system shown in FIG. 9 to the system shown in FIG. 10. The bus bridge 100 automatically senses that the daughterboard 400 has been added to upgrade to the new bus interface configuration. The bus bridge 100 retrieves and implements operating parameters to re-configure itself from the old bus interface configuration of FIG. 11 to the current bus interface configuration of FIG. 12. This modular upgrade capability allows the user to easily upgrade the bus bridge by simply plugging in new daughterboards. The bus bridge 100 automatically re-configures itself to operate according to the current bus interface configuration.

In one embodiment of the invention, the bus bridge 100 comprises a RAID controller and the devices 1144 and 1250 comprise disk drives for the RAID system. The bus interface configuration of the RAID controller can be upgraded through the addition of daughterboards. The RAID controller senses the upgrade and reconfigures itself to operate according to the new bus interface configuration.

Figure 13:
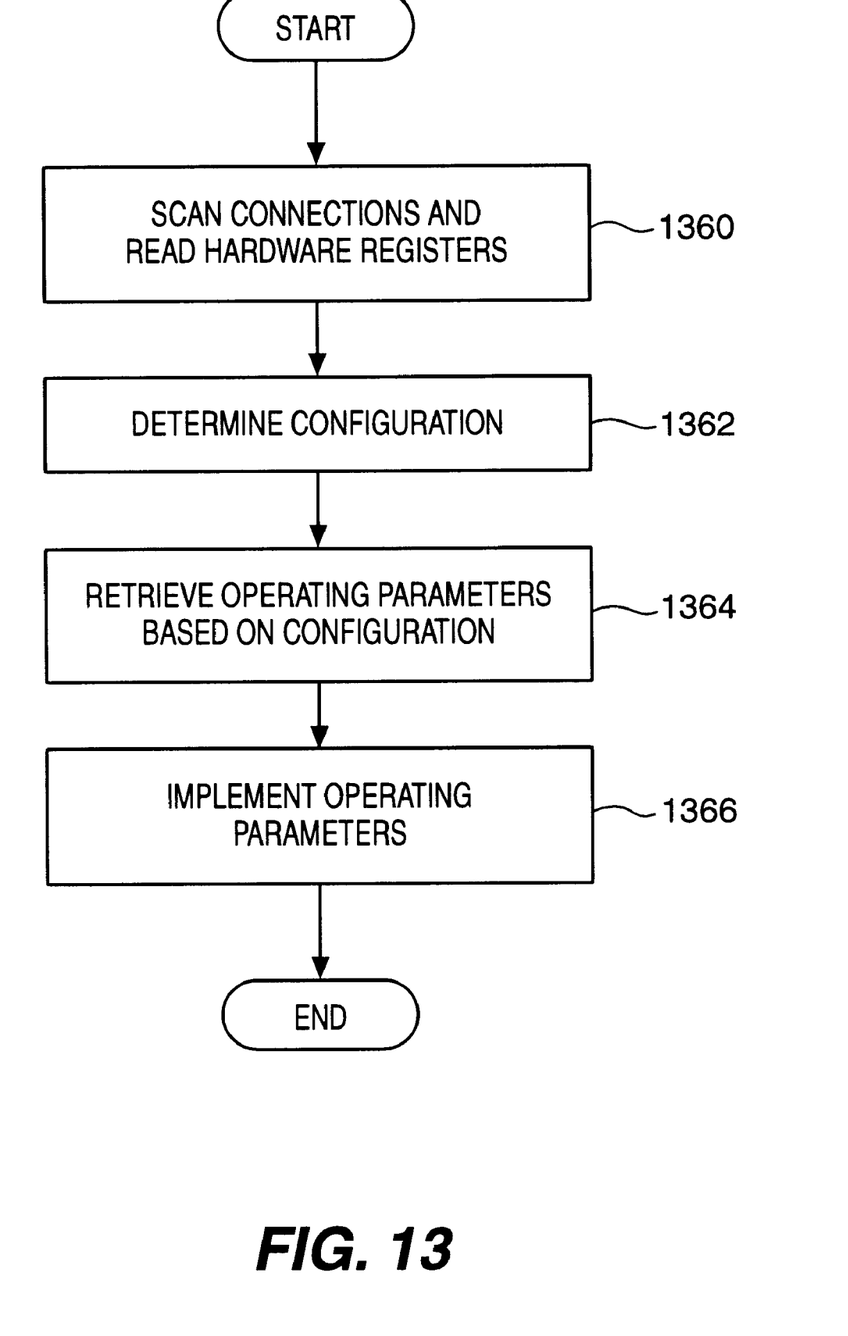
FIG. 13 is a flow diagram of system operation in an embodiment of the invention.

System Operation—FIG. 13

FIG. 13 depicts the operation of the bus bridge 100 during the bus interface configuration process. This operation typically results when the bus bridge processor executes instructions stored in the bus bridge memory. When the process is started, the bus bridge scans the connectors and reads various hardware registers in step 1360. The scan could be a conventional PCI operation. The hardware registers are located on the various boards and contain ID bits that indicate the type of bus interface capability on the board.

The scan and the hardware registers provide the bus bridge processor with information to detect the current bus interface configuration in step 1362. For example, the bus interface configuration of FIG. 11 is detected when the bus bridge is connected as depicted in FIG. 9. The bus interface configuration of FIG. 12 is detected when the bus bridge is connected as depicted in FIG. 10.

In step 1364, operating parameters are retrieved from memory based on the current bus interface configuration. Step 1364 could be accomplished by entering a look-up table in memory based on the configuration detected in step 1362. The look-up table would yield the operating parameters to implement the configuration.

In step 1366, the bus bridge uses the operating parameters to implement the current configuration. The operating parameters specify the assignments for the various pins of the connectors in the bus bridge to implement the bus interface configuration. The operating parameters would specify the assignment of particular pins to particular functions for particular bus interfaces. For example, a particular pin may be assigned as a SCSI signal ground for a SCSI bus interface to a group of peripheral devices. Those skilled in the art are familiar with the pin assignments for a bus interface configuration of a bus bridge.

Those skilled in the art can appreciate variations of the above-described embodiments that fall within the scope of the invention. Therefore, the invention is not limited to the specific embodiments discussed above, but only by the following claims and their equivalents.

What is claimed is:

1. A bus bridge for connecting a computer to peripheral devices over a plurality of different bus interface pin configurations, the bus bridge comprising:
   bus interface logic operational to support the different bus interface pin configurations;
   a processor operational to execute instructions that direct the processor to detect a current bus interface pin configuration from among the different bus interface pin configurations based on an arrangement of modular daughterboards connected to the bus bridge and to retrieve operating parameters to implement the current bus interface pin configuration; and
   a memory operationally connected to the processor and operational to store the instructions and the operating parameters for the different bus interface pin configurations.

2. The bus bridge of claim 1 wherein the current bus interface pin configuration is a first small computer system interface to the computer and a second small computer system interface to the peripheral devices.

3. The bus bridge of claim 1 wherein the current bus interface pin configuration is a first small computer system interface to the computer, a second small computer system interface to a first group of the peripheral devices, and a third small computer system interface to a second group of the peripheral devices.

4. The bus bridge of claim 1 wherein the current bus interface pin configuration is a fiber channel to the computer, a first small computer system interface to a first group of the peripheral devices, and a second small computer system interface to a second group of the peripheral devices.

5. The bus bridge of claim 1 wherein the current bus interface pin configuration is a fiber channel to the computer, a first small computer system interface to a first group of the peripheral devices, a second small computer system interface to a second group of the peripheral devices, and a third small computer system interface to a third group of the peripheral devices.

6. The bus bridge of claim 1 wherein the bus bridge comprises a RAID controller.

7. A bus bridge for connecting a computer to peripheral devices over a plurality of different bus interface pin configurations, the bus bridge comprising:
   a motherboard operational for implementing a first bus interface pin configuration and comprising:
      a first connector operational for connection to the computer;
      a second connector operationally coupled to the first connector;
      first bus interface logic operationally coupled to the first connector;
      a processor operational to execute instructions that direct the processor to detect a current bus interface pin configuration from among the different bus interface pin configurations and to retrieve operating parameters to implement the current bus interface pin configuration;
      a memory operationally coupled to the processor and operational to store the instructions and the operating parameters for the different bus interface pin configurations;
   a first daughterboard operational for implementing a second bus interface pin configuration and comprising:
      a third connector operational for connection to the second connector;
      second bus interface logic operationally coupled to the third connector; and
      a fourth connector operationally coupled to the third connector and operational for connection to another daughterboard; and
   wherein the processor in the motherboard detects the current bus interface pin configuration based on the second bus interface pin configuration implemented by the first daughterboard.

8. The bus bridge of claim 7 wherein the first bus interface logic is small computer system interface logic.

9. The bus bridge of claim 7 wherein the second bus interface logic is small computer system interface logic.

10. The bus bridge of claim 7 wherein the first bus interface logic is fiber channel logic.

11. The bus bridge of claim 7 wherein the second bus interface logic is fiber channel logic.

12. The bus bridge of claim 7 wherein the second connector is connected to the third connector and the current bus interface pin configuration is a first small computer system interface to the computer and a second small computer system interface to the peripheral devices.

13. The bus bridge of claim 7 further comprising a second daughterboard operational for implementing a third bus interface pin configuration and comprising:
   a fifth connector operational for connection to the fourth connector;
   third bus interface logic operationally coupled to the fifth connector; and
   a sixth connector operationally coupled to the fifth connector and operational for connection to another daughterboard.

14. The bus bridge of claim 13 wherein the third bus interface logic is small computer system interface logic.

15. The bus bridge of claim 13 wherein the third bus interface logic is fiber channel logic.

16. The bus bridge of claim 13 wherein the second connector is connected to the third connector and the fourth connector is connected to the fifth connector, and wherein the current bus interface pin configuration is a fiber channel to the computer, a first small computer system interface to a first group of the peripheral devices, and a second small computer system interface to a second group of the peripheral devices.

17. The bus bridge of claim 13 wherein the second connector is connected to the third connector and the fourth connector is connected to the fifth connector, and wherein the current bus interface pin configuration is a first small computer system interface to the computer, a second small computer system interface to a first group of the peripheral devices, and a third small computer system interface to a second group of the peripheral devices.

18. The bus bridge of claim 13 wherein the bus bridge comprises a RAID controller.

* * * * *